(12) United States Patent
Dettinger et al.

(10) Patent No.: US 7,761,461 B2
(45) Date of Patent: Jul. 20, 2010

(54) METHOD AND SYSTEM FOR RELATIONSHIP BUILDING FROM XML

(75) Inventors: Richard D. Dettinger, Rochester, MN (US); Judy I. Djugash, New Brighton, MN (US); Joel C. Dubbels, Eyota, MN (US); Richard J. Stevens, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1527 days.

(21) Appl. No.: 10/821,228

(22) Filed: Apr. 8, 2004

(65) Prior Publication Data

US 2005/0228800 A1 Oct. 13, 2005

(51) Int. Cl.
*G06F 7/00* (2006.01)
*G06F 17/30* (2006.01)
(52) U.S. Cl. .................................. 707/756; 707/803
(58) Field of Classification Search ............... 707/4, 707/100
See application file for complete search history.

(56) References Cited

U.S. PATENT DOCUMENTS

| | | | |
|---|---|---|---|
| 5,899,988 A * | 5/1999 | Depledge et al. ............... 707/3 |
| 5,909,570 A | 6/1999 | Webber | |
| 6,725,227 B1 | 4/2004 | Li | |
| 2003/0065659 A1 * | 4/2003 | Agarwal et al. ................ 707/4 |
| 2003/0140308 A1 * | 7/2003 | Murthy et al. ............... 715/500 |
| 2004/0220927 A1 * | 11/2004 | Murthy et al. ................. 707/4 |
| 2005/0060647 A1 * | 3/2005 | Doan et al. ................... 715/514 |
| 2005/0097455 A1 * | 5/2005 | Zhou et al. ................... 715/513 |

OTHER PUBLICATIONS

Dettinger et al., IBM U.S. Appl. No. 10/083,075, filed Feb. 26, 2002, "Application Portability and Extensibility Through Database Schema and Query Abstraction".
http://www.ebi.ac.uk/arrayexpress, ArrayExpress from the European Bioinformatics Institute.

* cited by examiner

*Primary Examiner*—Apu M Mofiz
*Assistant Examiner*—Jared M Bibbee
(74) *Attorney, Agent, or Firm*—Patterson & Sheridan, LLP

(57) ABSTRACT

A method, system and article of manufacture for relationship building based on text-based markup languages and, more particularly, for representing relationships between data elements defined according to a first physical representation of data in a logical representation. The logical representation abstractly describes a second physical representation of the data, which is generated from the first physical representation of the data. On the basis of the relationships between the data elements, logical relationships each defining a path between data structures of the second physical representation are determined and associated with the logical representation.

44 Claims, 10 Drawing Sheets

US 7,761,461 B2

METHOD AND SYSTEM FOR RELATIONSHIP BUILDING FROM XML

CROSS-RELATED APPLICATION

This application is related to the following commonly owned application: U.S. patent application Ser. No. 10/083,075, filed Feb. 26, 2002, entitled "APPLICATION PORTABILITY AND EXTENSIBILITY THROUGH DATABASE SCHEMA AND QUERY ABSTRACTION", which is hereby incorporated herein in its entirety.

BACKGROUND OF THE INVENTION

1. Field of the Invention

The present invention generally relates to relationship building from XML and, more particularly, to extracting relationships from XML documents and creating corresponding relationships for a relational database.

2. Description of the Related Art

Databases are computerized information storage and retrieval systems. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

A relational database management system (RDBMS) is a computer database management system that uses relational techniques for storing and retrieving data. An RDBMS can be structured to support a variety of different types of operations for a requesting entity (e.g., an application, the operating system or an end user). Such operations can be configured to retrieve, add, modify and delete information being stored and managed by the RDBMS. Standard database access methods support these operations using high-level query languages, such as the Structured Query Language (SQL). The term "query" denominates a set of commands that cause execution of operations for processing data from a stored database. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database.

One advantage of an RDBMS is its capacity to process great volumes of data, such as micro array data obtained from micro array based experiments. Micro array data describes information related to manufacturing and design of micro arrays as well as information related to experiment setup and execution. Furthermore, micro array data can describe gene expression data and analysis results. Description and communication of micro array data can be performed using a standardized text-based markup language: MAGE-ML (MicroArray Gene Expression Markup Language). Specifically, MAGE-ML is based on XML (extensible Markup Language) and defines all required elements for supporting gene expression data. Accordingly, MAGE-ML represents gene expression data by corresponding XML documents. The XML documents can be mapped to the underlying relational model of an RDBMS. Thus, the micro array data in the RDBMS can be queried for data extraction and navigation using SQL.

One difficulty when mapping MAGE-ML, and more generally, XML documents, to a relational database, is representing the relationships from the XML documents in the relational database. For instance, assume micro array data described in MAGE-ML by hundreds of mega bytes long XML files with tremendous amounts of gene data. These XML files contain hierarchical tree structures in which the various nodes of the tree structures are related. However, during an automated process of mapping the XML files to a relational database, the hierarchical relationships are lost. Further, in a respective relational database there can be multiple relationship paths between the relational tables. As a result, a given SQL query may traverse any one of a variety of relationship paths in order to access and return the requested data. Unfortunately, the result set returned to the user depends on the particular relationship path traversed. By way of example, assume that the relational database includes seven tables A, B, C, D, E, F and G and that it is possible to get from A to C via a first path A->B->C and via a second path A->G->F->E->D->C. Assume now that a first result set is returned for the given SQL query if the first path is taken and that a second result set is returned if the second path is taken. Assume further that according to the relationships defined in the XML files the second path should be taken to determine a correct result set and that the first path leads to an incorrect result set. Thus, in order to guarantee that the correct result set is returned in response to the given SQL query, the relational database needs to represent the relationships defined by the XML files.

Therefore, there is a need for an efficient technique for extracting relationships from XML files and creating corresponding relationships for a relational database.

SUMMARY OF THE INVENTION

The present invention is generally directed to a method, system and article of manufacture for relationship building based on text-based markup languages and, more particularly, for extracting relationships from XML documents and creating corresponding relationships for a relational database.

One embodiment provides a computer-implemented method of logically representing relationships between data elements defined according to a first physical representation of data. The method includes providing a logical representation of the data abstractly describing a second physical representation of the data, wherein the second physical representation of the data is generated from the first physical representation of the data. On the basis of the relationships between the data elements defined according to the first physical representation of the data, corresponding relationships between corresponding data structures defined according to the second physical representation of the data are determined. Then, logical relationships abstractly describing the determined corresponding relationships are generated. Each logical relationship defines a path between data structures of the second physical representation. The generated logical relationships are associated with the logical representation of the data.

Another embodiment provides a computer-implemented method of logically representing relationships between data elements defined according to a first physical representation of data. The method includes generating a second physical representation of the data from the first physical representation and generating a logical representation of the data as represented according to the second physical representation. The logical representation abstractly describes the second physical representation of the data. On the basis of the relationships between the data elements defined according to the first physical representation of the data, corresponding relationships between corresponding data structures defined according to the second physical representation of the data are determined. Then, logical relationships abstractly describing the determined corresponding relationships are generated. The generated logical relationships are included with the logical representation, wherein each of the generated logical relationships describes a path for traversing the second physical representation from a first data structure to a second data structure when processing a query requesting information related to the first and second data structures.

Still another embodiment provides a computer-implemented method of logically representing relationships between data elements described in an extended Markup Language (XML) document. The method includes retrieving a relational database schema for a plurality of data structures, each data structure corresponding to one of the data elements, and retrieving a logical representation abstractly describing the relational database schema. Furthermore, the relationships between the data elements from the XML document are determined. On the basis of the determined relationships, corresponding relationships between corresponding data structures defined according to the relational database schema are determined. Then, logical relationships abstractly describing the determined corresponding relationships are generated and included with the logical representation. Each of the generated logical relationships describes a path for traversing a relational database constructed according to the relational database schema from a first data structure to a second data structure when processing a query requesting information related to the first and second data structures.

Still another embodiment provides a computer-implemented method of querying physical data logically represented by a data abstraction model. The physical data being queried is contained in data structures generated from a data source having a different schema from the data structures containing the physical data being queried. The method includes receiving an abstract query comprising logical fields and corresponding values. Each of the logical fields is defined in the data abstraction model and wherein one or more of the logical fields are result fields to be returned by execution of the abstract query. Then, the abstract query is transformed into an executable query capable of being executed against the physical data. The transforming is done using the data abstraction model that defines a specific path for traversing the data structures containing the physical data to reach the one or more result fields.

Still another embodiment provides a computer-readable medium containing a program which, when executed by a processor, performs a process of logically representing relationships between data elements defined according to a first physical representation of data. The process includes retrieving a logical representation of the data abstractly describing a second physical representation of the data, wherein the second physical representation of the data is generated from the first physical representation of the data. On the basis of the relationships between the data elements defined according to the first physical representation of the data, corresponding relationships between corresponding data structures defined according to the second physical representation of the data are determined. Then, logical relationships abstractly describing the determined corresponding relationships are generated. Each logical relationship defines a path between data structures of the second physical representation. The generated logical relationships are associated with the logical representation of the data.

Still another embodiment provides a computer-readable medium containing a program which, when executed by a processor, performs a process of logically representing relationships between data elements defined according to a first physical representation of data. The process includes generating a second physical representation of the data from the first physical representation and generating a logical representation of the data as represented according to the second physical representation. The logical representation abstractly describes the second physical representation of the data. On the basis of the relationships between the data elements defined according to the first physical representation of the data, corresponding relationships between corresponding data structures defined according to the second physical representation of the data are determined. Then, logical relationships abstractly describing the determined corresponding relationships are generated and included with the logical representation. Each of the generated logical relationships describes a path for traversing the second physical representation from a first data structure to a second data structure when processing a query requesting information related to the first and second data structures.

Still another embodiment provides a computer-readable medium containing a program which, when executed by a processor, performs a process of logically representing relationships between data elements described in an extended Markup Language (XML) document. The process includes retrieving a relational database schema for a plurality of data structures, each data structure corresponding to one of the data elements, and retrieving a logical representation abstractly describing the relational database schema. Furthermore, the relationships between the data elements from the XML document are determined. On the basis of the determined relationships, corresponding relationships between corresponding data structures defined according to the relational database schema are determined. Then, logical relationships abstractly describing the determined corresponding relationships are determined and including with the logical representation. Each of the generated logical relationships describes a path for traversing a relational database constructed according to the relational database schema from a first data structure to a second data structure when processing a query requesting information related to the first and second data structures.

Still another embodiment provides a computer-readable medium containing a program which, when executed by a processor, performs a process of querying physical data logically represented by a data abstraction model. The physical data being queried is contained in data structures generated from a data source having a different schema from the data structures containing the physical data being queried. The process includes receiving an abstract query comprising logical fields and corresponding values. Each of the logical fields is defined in the data abstraction model and one or more of the logical fields are result fields to be returned by execution of the abstract query. The abstract query is transformed into an executable query capable of being executed against the physical data. The transforming is done using the data abstraction model. The data abstraction model defines a specific path for traversing the data structures containing the physical data to reach the one or more result fields.

Yet another embodiment provides a data structure residing in memory, including a plurality of logical field specifications, each abstractly describing at least one of a plurality of data structures defined according to a physical representation of data. At least one of the plurality of logical field specifications includes one or more logical relationships algorithmically generated from relationship information describing relationships between the data represented according to another physical representation of the data. Each logical relationship describes a path for traversing the physical representation of the data from a first data structure to a second data structure when processing a query requesting information related to the first and second data structures.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
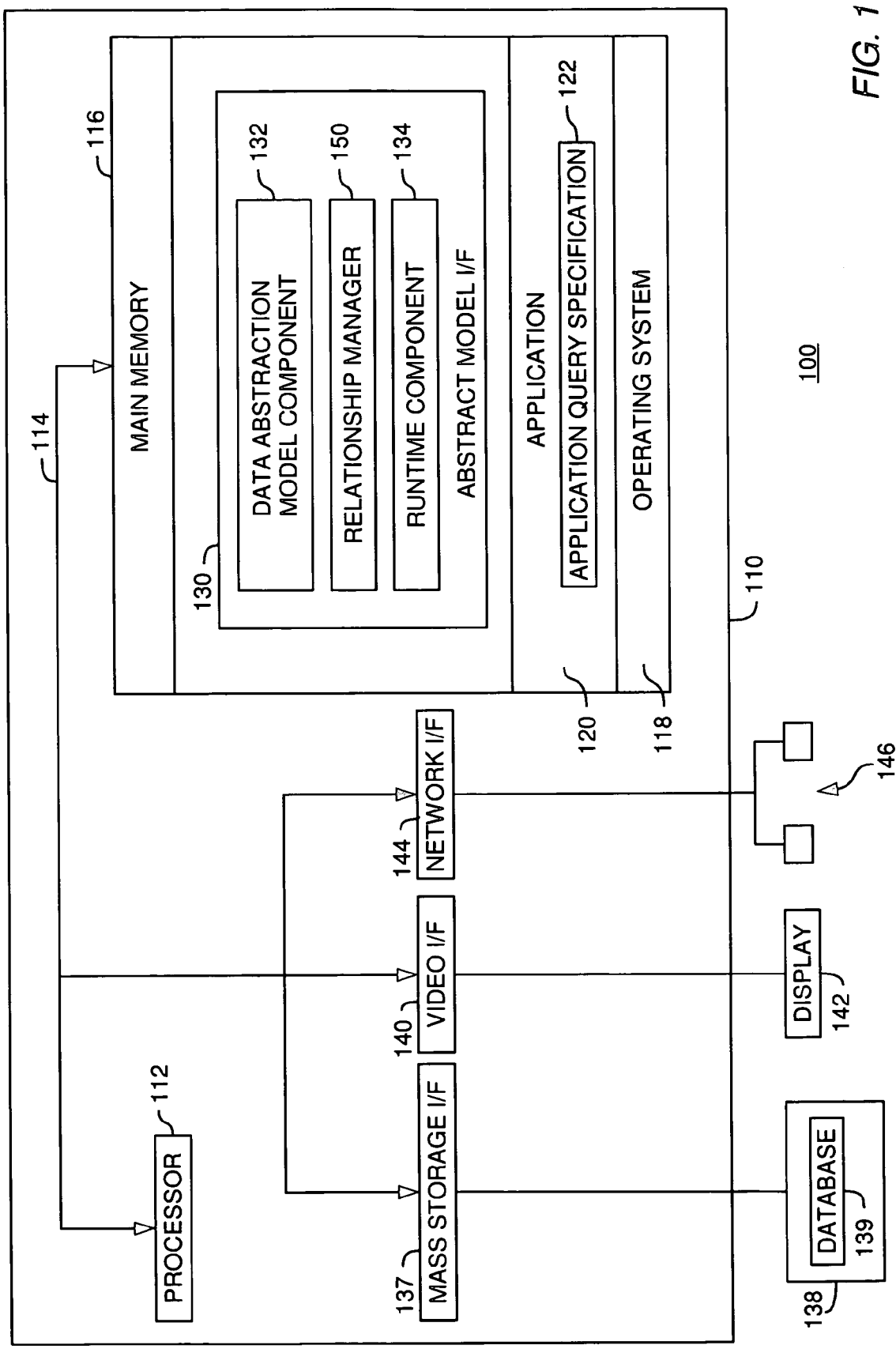
FIG. 1 is a computer system illustratively utilized in accordance with the invention.

The present invention generally is directed to a system, method and article of manufacture for relationship building from a physical representation of data and, more particularly, for representing relationships from a first physical representation of data in a data abstraction model that describes an abstract view of a second physical representation of the data. In one embodiment, the first physical representation of the data is a document in text-based markup language, such as an XML document, and the second physical representation of the data is a relational database schema.

According to one aspect, the XML document describes data elements having predefined relationships. The data of the XML document can be used to populate a corresponding relational database that is organized according to the relational database schema. More specifically, the relational database includes a plurality of data structures, such as database tables, that are organized according to the relational database schema. Each data structure of the plurality of data structures corresponds to one of the data elements from the XML document. Accordingly, the relational database schema can be generated from the XML document.

In one embodiment, relationships between data structures of the relational database are determined on the basis of the predefined relationships between the data elements in the XML document. On the basis of the determined relationships between the data structures, logical relationships can be generated which abstractly describe these determined relationships. Each generated logical relationship describes a path for traversing the relational database from a first database table to a second database table when processing a query requesting information related to the first and second data structures. The generated logical relationships are included with a data abstraction model to represent the predefined relationships between the data elements of the XML document in the relational database. The data abstraction model can be generated on the basis of the relational database schema and includes a plurality of logical field specifications, each abstractly describing physical location information related to at least one of the plurality of data structures of the relational database.

In one embodiment, an abstract query including logical fields and corresponding values is issued against the relational database. Each of the logical fields is defined in the data abstraction model and one or more of the logical fields are result fields to be returned by execution of the abstract query. The data abstraction model defines a specific path for traversing the database tables containing the physical data in the relational database to reach the one or more result fields. Thus, using the data abstraction model, the abstract query can be transformed into a concrete query that can be executed against the relational database.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, computer system 110 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Referring now to FIG. 1, a computing environment 100 is shown. In general, the distributed environment 100 includes computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer computer available from International Business Machines of Armonk, N.Y.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 110 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer system 110 via bus 114.

The memory 116 is shown configured with an operating system 118. The operating system 118 is the software used for managing the operation of the computer system 110. Examples of the operating system 118 include IBM OS/400®, UNIX, Microsoft Windows®, and the like.

The memory 116 further includes one or more applications 120 and an abstract model interface 130. The applications 120 and the abstract model interface 130 are software products comprising a plurality of instructions that are resident at various times in various memory and storage devices in the computer system 110. When read and executed by one or more processors 112 in the computer system 110, the applications 120 and the abstract model interface 130 cause the computer system 110 to perform the steps necessary to execute steps or elements embodying the various aspects of the invention. The applications 120 (and more generally, any requesting entity, including the operating system 118) are configured to issue queries against a database 139 (shown in storage 138). The database 139 is representative of any collection of data regardless of the particular physical representation of the data. A physical representation of data defines an organizational schema of the data. By way of illustration, the database 139 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

The queries issued by the applications 120 are defined according to an application query specification 122 included with each application 120. The queries issued by the applications 120 may be predefined (i.e., hard coded as part of the applications 120) or may be generated in response to input (e.g., user input). In either case, the queries (referred to herein as "abstract queries") are composed using logical fields defined by the abstract model interface 130. A logical field defines an abstract view of data whether as an individual data item or a data structure in the form of, for example, a database table. In particular, the logical fields used in the abstract queries are defined by a data abstraction model component 132 of the abstract model interface 130. In one embodiment, the data abstraction model component 132 includes relationship information created by a relationship manager 150. Operation and interaction of the data abstraction model 132 and the relationship manager 150 are further described with reference to FIGS. 6-10.

A runtime component 134 transforms the abstract queries under consideration of the relationship information into concrete queries having a form consistent with the physical representation of the data contained in the database 139. The concrete queries can be executed by the runtime component 134 against the database 139. Operation of the runtime component 134 is further described below with reference to FIG. 2.

Figure 2:
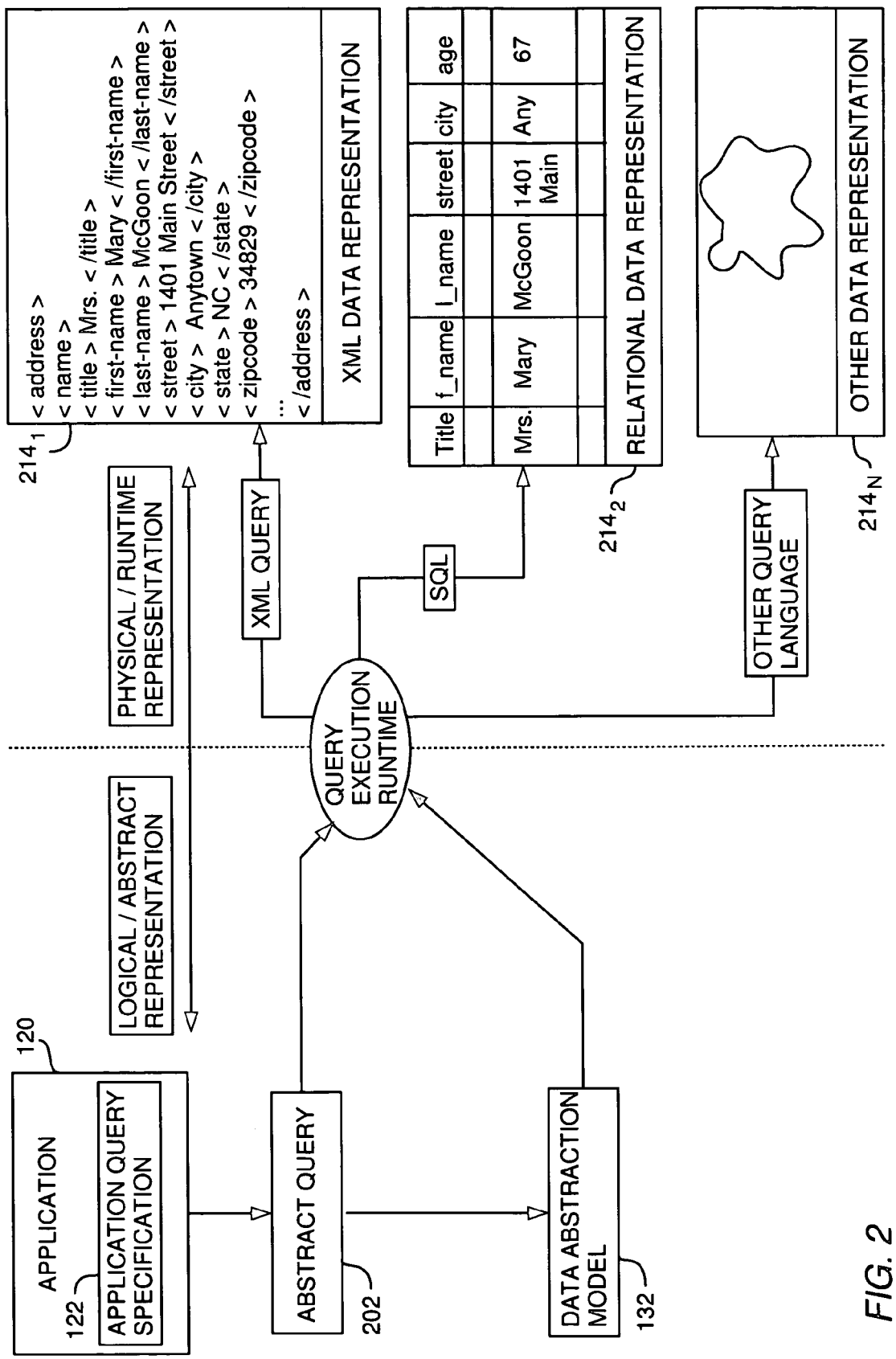
FIGS. 2-3 are relational views of software components for abstract query management.

Referring now to FIG. 2, a relational view illustrating interaction of the runtime component 134, the application 120 and the data abstraction model 132 at query execution runtime is shown. The data abstraction model 132 is also referred to herein as a "logical representation" because the data abstraction model 132 defines logical fields corresponding to data structures in a database (e.g., database 139), thereby providing an abstract, i.e., a logical view of the data in the database. A data structure is a physical arrangement of the data, such as an arrangement in the form of a database table or a column of the database table. In a relational database environment having a multiplicity of database tables, a specific logical representation having specific logical fields can be provided for each database table. In this case, all specific logical representations together constitute the data abstraction model 132.

Physical entities of the data are arranged in the database 139 according to a physical representation of the data. A physical entity of data (interchangeably referred to as a physical data entity) is a data item in an underlying physical representation. Accordingly, a physical data entity is the data included in a database table or in a column of the database table, i.e., the data itself. By way of illustration, two physical representations are shown, an XML data representation $214_1$ and a relational data representation $214_2$. However, the physical representation $214_N$ indicates that any other physical representation, known or unknown, is contemplated. In one embodiment, a different single data abstraction model 132 is provided for each separate physical representation 214, as explained above for the case of a relational database environment. In an alternative embodiment, a single data abstraction model 132 contains field specifications (with associated access methods) for two or more physical representations 214. A field specification is a description of a logical field and generally comprises a mapping rule that maps the logical field to a data structure(s) of a particular physical representation.

Figure 3:
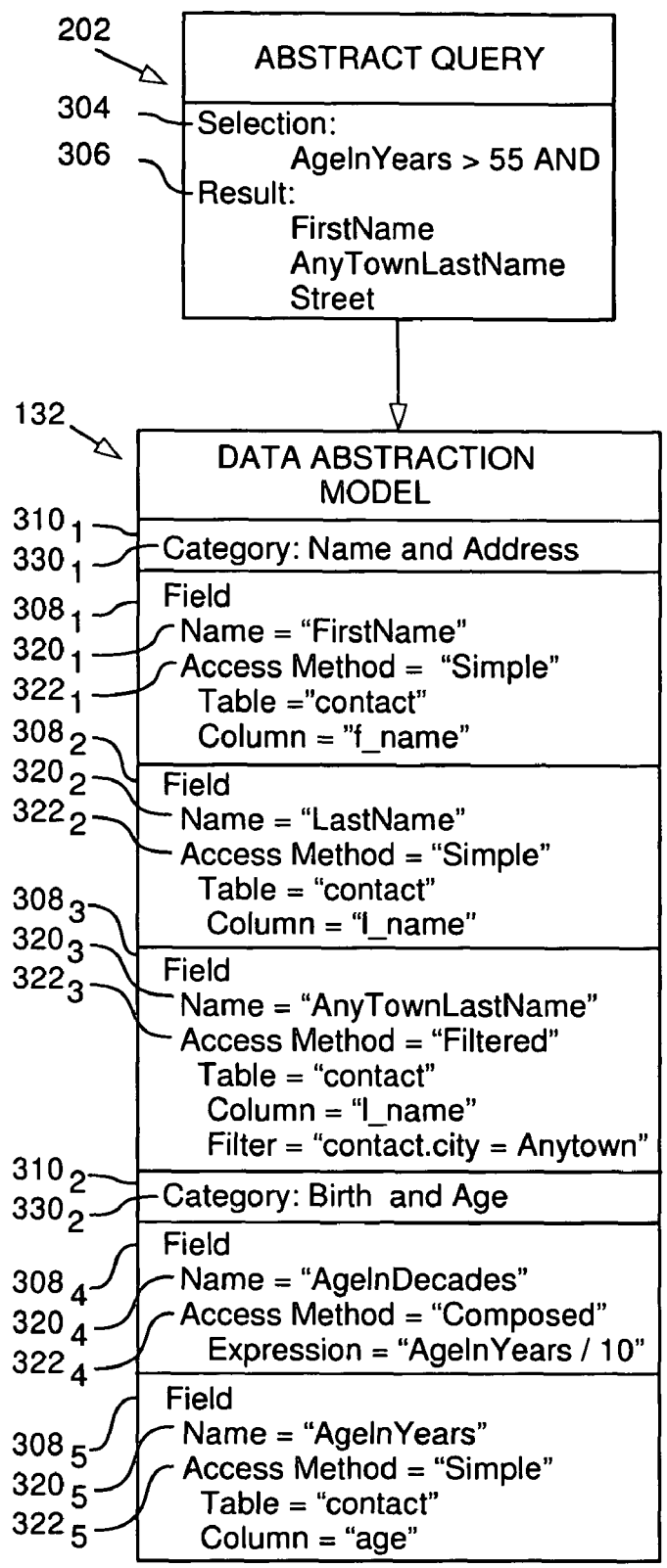

Using a logical representation of the data, the application query specification 122 specifies one or more logical fields to compose a resulting query 202. A requesting entity (e.g., the application 120) issues the resulting query 202 as defined by an application query specification of the requesting entity. In one embodiment, the abstract query 202 may include both criteria used for data selection and an explicit specification of result fields to be returned based on the data selection criteria. An example of the selection criteria and the result field specification of the abstract query 202 is shown in FIG. 3. Accordingly, the abstract query 202 illustratively includes selection criteria 304 and a result field specification 306.

The resulting query 202 is generally referred to herein as an "abstract query" because the query is composed according to abstract (i.e., logical) fields rather than by direct reference to the underlying data structures in the database 139. As a result, abstract queries may be defined that are independent of the particular underlying physical data representation used. For execution, the abstract query is transformed into a concrete query consistent with the underlying physical representation of the data using the data abstraction model 132. The concrete query is executable against the database 139.

In general, the data abstraction model 132 exposes information as a set of logical fields that may be used within an abstract query to specify criteria for data selection and specify the form of result data returned from a query operation. The logical fields are defined independently of the underlying physical representation being used in the database 139, thereby allowing abstract queries to be formed that are loosely coupled to the underlying physical representation.

Referring now to FIG. 3, a relational view illustrating interaction of the abstract query 202 and the data abstraction model 132 is shown. In one embodiment, the data abstraction model 132 comprises a plurality of field specifications $308_1$, $308_2$, $308_3$, $308_4$ and $308_5$ (five shown by way of example), collectively referred to as the field specifications 308. Specifically, a field specification is provided for each logical field available for composition of an abstract query. Each field specification may contain one or more attributes. Illustratively, the field specifications 308 include a logical field name attribute $320_1$, $320_2$, $320_3$, $320_4$, $320_5$ (collectively, field name 320) and an associated access method attribute $322_1$, $322_2$, $322_3$, $322_4$, $322_5$ (collectively, access methods 322). Each attribute may have a value. For example, logical field name attribute $320_1$ has the value "FirstName" and access method attribute $322_1$ has the value "Simple". Furthermore, each attribute may include one or more associated abstract properties. Each abstract property describes a characteristic of a data structure and has an associated value. As indicated above, a data structure refers to a part of the underlying physical representation that is defined by one or more physical entities of the data corresponding to the logical field. In particular, an abstract property may represent data location metadata abstractly describing a location of a physical data entity corresponding to the data structure, like a name of a database table or a name of a column in a database table. Illustratively, the access method attribute $322_1$ includes data location metadata "Table" and "Column". Furthermore, data location metadata "Table" has the value "contact" and data location metadata "Column" has the value "f_name". Accordingly, assuming an underlying relational database schema in the present example, the values of data location metadata "Table" and "Column" point to a table "contact" having a column "f_name".

In one embodiment, groups (i.e. two or more) of logical fields may be part of categories. Accordingly, the data abstraction model 132 includes a plurality of category specifications $310_1$ and $310_2$ (two shown by way of example), collectively referred to as the category specifications. In one embodiment, a category specification is provided for each logical grouping of two or more logical fields. For example, logical fields $308_{1-3}$ and $308_{4-5}$ are part of the category specifications $310_1$ and $310_2$, respectively. A category specification is also referred to herein simply as a "category". The categories are distinguished according to a category name, e.g., category names $330_1$ and $330_2$ (collectively, category name(s) 330). In the present illustration, the logical fields $308_{1-3}$ are part of the "Name and Address" category and logical fields $308_{4-5}$ are part of the "Birth and Age" category.

The access methods 322 generally associate (i.e., map) the logical field names to data in the database (e.g., database 139). Any number of access methods is contemplated depending upon the number of different types of logical fields to be supported. In one embodiment, access methods for simple fields, filtered fields and composed fields are provided. The field specifications $308_1$, $308_2$ and $308_5$ exemplify simple field access methods $322_1$, $322_2$, and $322_5$, respectively. Simple fields are mapped directly to a particular data structure in the underlying physical representation (e.g., a field mapped to a given database table and column). By way of illustration, as described above, the simple field access method $322_1$ maps the logical field name $320_1$ ("FirstName") to a column named "f_name" in a table named "contact". The field specification $308_3$ exemplifies a filtered field access method $322_3$. Filtered fields identify an associated data structure and provide filters used to define a particular subset of items within the physical representation. An example is provided in FIG. 3 in which the filtered field access method $322_3$ maps the logical field name $320_3$ ("AnyTownLastName") to data in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $308_4$ exemplifies a composed field access method $322_4$. Composed access methods compute a logical field from one or more data structures using an expression supplied as part of the access method definition. In this way, information which does not exist in the underlying physical data representation may be computed. In the example illustrated in FIG. 3 the composed field access method $322_4$ maps the logical field name $320_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. However, in another embodiment, the data format of the field specifications 308 is different from the associated underlying physical data, in which case a conversion of the underlying physical data into the format of the logical field is required.

By way of example, the field specifications 308 of the data abstraction model 132 shown in FIG. 3 are representative of logical fields mapped to data represented in the relational data representation $214_2$ shown in FIG. 2. However, other instances of the data abstraction model 132 map logical fields to other physical representations, such as XML.

An illustrative abstract query corresponding to the abstract query 202 shown in FIG. 3 is shown in Table I below. By way of illustration, the illustrative abstract query is defined using XML. However, any other language may be used to advantage.

TABLE I

ABSTRACT QUERY EXAMPLE

```
001   <?xml version="1.0"?>
002   <!--Query string representation: (AgeInYears > "55"-->
003   <QueryAbstraction>
004     <Selection>
005       <Condition internalID="4">
006         <Condition field="AgeInYears" operator="GT" value="55"
007           internalID="1"/>
008     </Selection>
009     <Results>
010       <Field name="FirstName"/>
011       <Field name="AnyTownLastName"/>
012       <Field name="Street"/>
013     </Results>
014   </QueryAbstraction>
```

Illustratively, the abstract query shown in Table I includes a selection specification (lines 004-008) containing selection criteria and a result specification (lines 009-013). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative data abstraction model (DAM) corresponding to the data abstraction model 132 shown in FIG. 3 is shown in Table II below. By way of illustration, the illustrative data abstraction model is defined using XML. However, any other language may be used to advantage.

TABLE II

DATA ABSTRACTION MODEL EXAMPLE

```
001   <?xml version="1.0"?>
002   <DataAbstraction>
003     <Category name="Name and Address">
004       <Field queryable="Yes" name="FirstName" displayable="Yes">
005         <AccessMethod>
006           <Simple columnName="f_name" tableName="contact"></Simple>
007         </AccessMethod>
008       </Field>
009       <Field queryable="Yes" name="LastName" displayable="Yes">
010         <AccessMethod>
011           <Simple columnName="l_name" tableName="contact"></Simple>
012         </AccessMethod>
013       </Field>
014       <Field queryable="Yes" name="AnyTownLastName" displayable="Yes">
015         <AccessMethod>
016           <Filter columnName="l_name" tableName="contact">
017           </Filter="contact.city=Anytown">
018         </AccessMethod>
019       </Field>
020     </Category>
021     <Category name="Birth and Age">
022       <Field queryable="Yes" name="AgeInDecades" displayable="Yes">
023         <AccessMethod>
024           <Composed columnName="age" tableName="contact">
025           </Composed Expression="columnName/10">
026         </AccessMethod>
027       </Field>
028       <Field queryable="Yes" name="AgeInYears" displayable="Yes">
029         <AccessMethod>
030           <Simple columnName="age" tableName="contact"></Simple>
031         </AccessMethod>
032       </Field>
033     </Category>
034   </DataAbstraction>
```

By way of example, note that lines 004-008 correspond to the first field specification $308_1$ of the DAM 132 shown in FIG. 3 and lines 009-013 correspond to the second field specification $308_2$.

Figure 4:
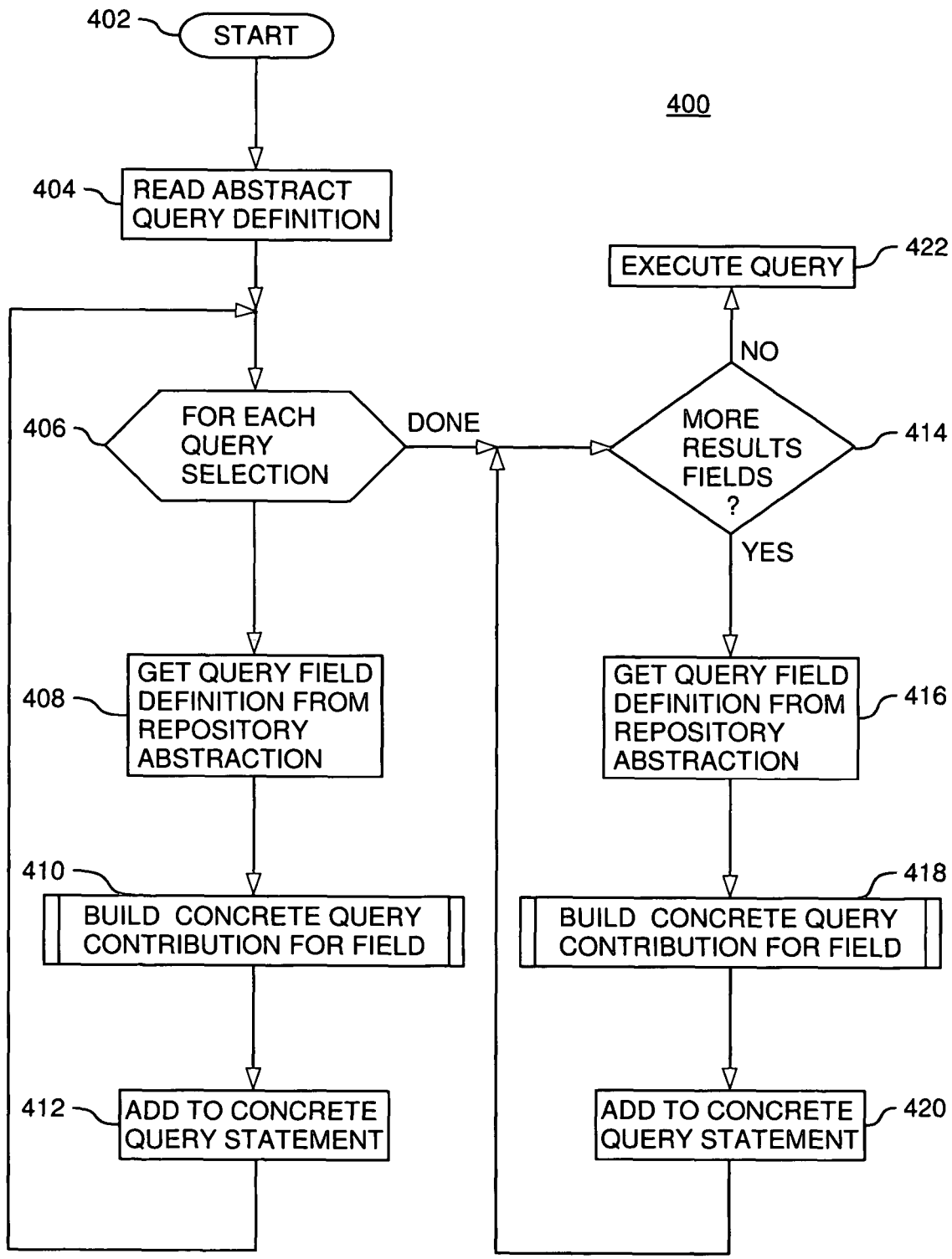
FIGS. 4-5 are flow charts illustrating the operation of a runtime component.

Referring now to FIG. 4, an illustrative runtime method 400 exemplifying one embodiment of the operation of the runtime component 134 is shown. The method 400 is entered at step 402 when the runtime component 134 receives as input an abstract query (such as the abstract query shown in Table I). At step 404, the runtime component 134 reads and parses the abstract query and locates individual selection criteria and desired result fields. At step 406, the runtime component 134 enters a loop (comprising steps 406, 408, 410 and 412) for processing each query selection criteria statement present in the abstract query, thereby building a data selection portion of a concrete query. In one embodiment, a selection criterion consists of a field name (for a logical field), a comparison operator (=, >, <, etc) and a value expression (what is the field being compared to). At step 408, the runtime component 134 uses the field name from a selection criterion of the abstract query to look up the definition of the field in the data abstraction model 132. As noted above, the field definition includes a definition of the access method used to access the data structure associated with the field. The runtime component 134 then builds (step 410) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 139 shown in FIG. 1. The concrete query contribution generated for the current field is then added to a concrete query statement. The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the runtime component 134 identifies the information to be returned as a result of query execution. As described above, in one embodiment, the abstract query defines a list of logical fields that are to be returned as a result of query execution, referred to herein as a result specification. A result specification in the abstract query may consist of a field name and sort criteria. Accordingly, the method 400 enters a loop at step 414 (defined by steps 414, 416, 418 and 420) to add result field definitions to the concrete query being generated. At step 416, the runtime component 134 looks up a result field name (from the result specification of the abstract query) in the data abstraction model 132 and then retrieves a result field definition from the data abstraction model 132 to identify the physical location of data to be returned for the current logical result field. The runtime component 134 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, the concrete query is executed at step 422.

Figure 5:
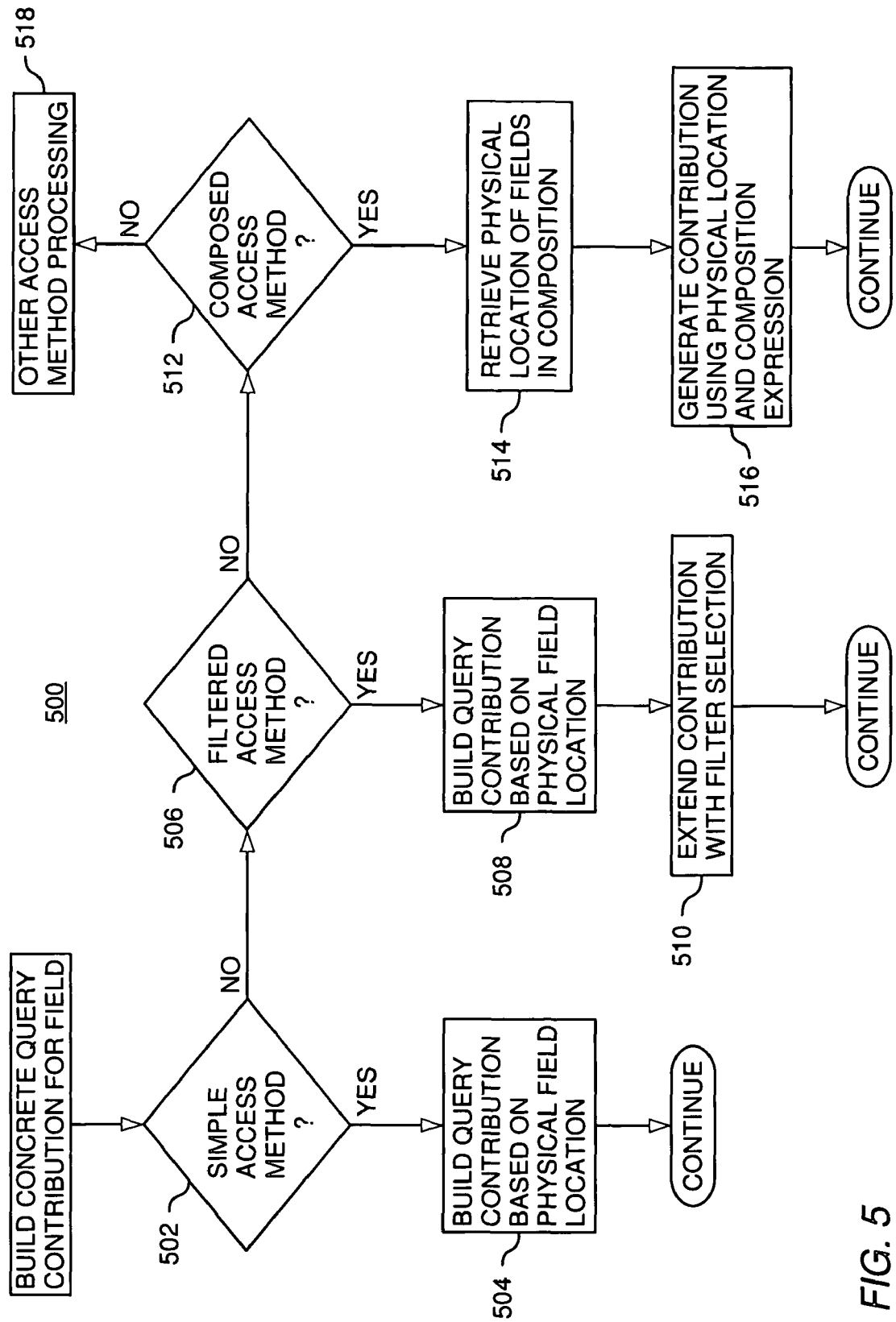

One embodiment of a method 500 for building a concrete query contribution for a logical field according to steps 410 and 418 is described with reference to FIG. 5. At step 502, the method 500 queries whether the access method associated with the current logical field is a simple access method. If so, the concrete query contribution is built (step 504) based on physical data location information and processing then continues according to method 400 described above. Otherwise, processing continues to step 506 to query whether the access method associated with the current logical field is a filtered access method. If so, the concrete query contribution is built (step 508) based on physical data location information for a given data structure(s). At step 510, the concrete query contribution is extended with additional logic (filter selection) used to subset data associated with the given data structure(s). Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access method types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

Figure 6:
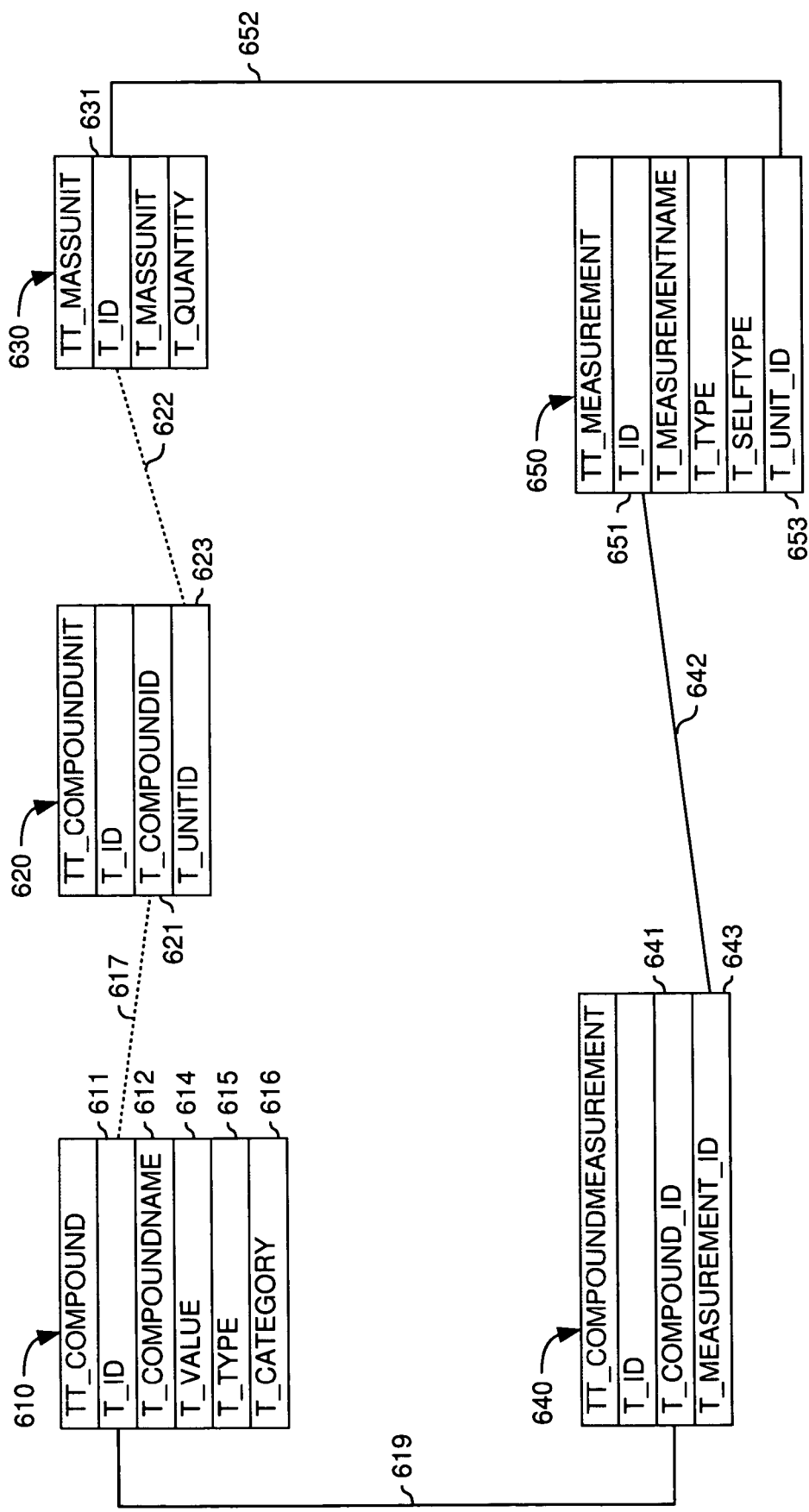
FIGS. 6-7 is a relational view illustrating relationships between different database tables.
Figure 7:
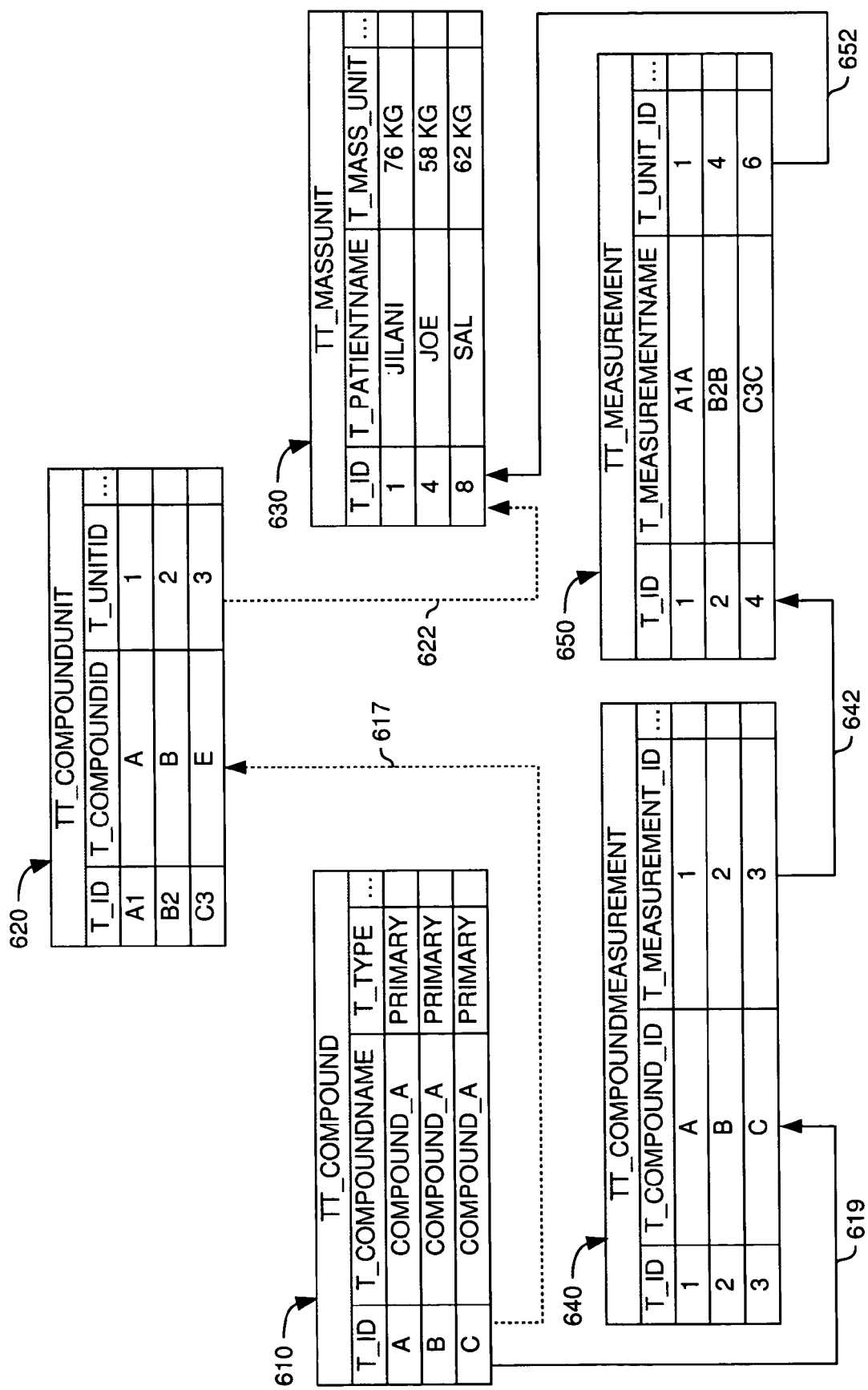

As was noted above, the data abstraction model provides a logical view or representation of an underlying physical data model, such as a relational database. The relational database may include a plurality of tables having various relationships. With reference to FIGS. 6 and 7, a corresponding illustrative relational database is shown.

Referring now to FIGS. 6 and 7, a schematic view of a relational database (e.g., relational database $214_2$ of FIG. 2) is shown. According to FIG. 6, the relational database includes a plurality of database tables 610-650 (five database tables "TT_COMPOUND", "TT_COMPOUNDUNIT", "TT_MASSUNIT", "TT_COMPOUNDMEASUREMENT" and "TT_MEASUREMENT" are illustrated by way of example). Each of the database tables 610-650 includes a plurality of columns shown as separate fields. By way of example, database table 610 is shown having five separate fields. The fields representing the columns are arranged vertically for economy of space. For instance, database table 610 includes five columns 611, 612, 614, 615 and 616 designated as "T_ID", "T_COMPOUNDNAME", "T_VALUE", "T_TYPE" and "T_CATEGORY", respectively. In FIG. 7, the database tables 610-650 are illustratively populated with physical data entities from an underlying MAGE-ML document. For brevity, only three columns are shown in each one of the database tables 610-650 in FIG. 7. By way of example, table 610 includes information directed towards compounds for micro array type analyses. Table 630 includes information directed towards patients, such as patient names and weights. Tables 620 and 640-650 may include information related to multiple medical examinations, such as Magnetic Resonance Angiography (MRA), cancer cell identification and the like.

The plurality of database tables 610-650 in FIGS. 6 and 7 is organized according to a relational database schema. The relational database schema defines relationships between different database tables. More specifically, each relationship defines a path that links a first database table to a second database table. The path may include one or more other database tables. By way of example, two different paths are shown which link the database table 610 to the database table 630. A first path is represented by connectors (i.e., dashed lines) 617 and 622. Specifically, the first path links column 611 of table 610 to column 621 of table 620 and column 623 of table 620 to column 631 of table 630. A second path is represented by connectors 619, 642 and 652. Specifically, the second path links column 611 of table 610 to column 641 of table 640, column 643 of table 640 to column 651 of table 650 and column 653 of table 650 to column 631 of table 630.

One of the first and second path is selected when a query (e.g., abstract query 202 of FIG. 2) selecting result fields from the tables 610 and 630 is received against the relational database. However, depending on the selected path, the query result may vary. More specifically, assume that an abstract query is received that requests for information about all patients having had a "COMPOUND_A" type analysis. As described above, table 630 contains information about the patients and table 610 contains information about compounds for micro array type analyses. Thus, in order to determine a corresponding query result, the tables 610 and 630 must be properly related to one another. As described above, the first and second path can be used in the given example to relate the tables 610 and 630 to one another. Consequently, one of these paths is selected to determine the query result. If the first path, i.e., the path defined by connectors 617 and 622 is selected, "JILANI" is obtained as first query result. If the second path, i.e., the path defined by connectors 619, 642 and 652 is selected, "JILANI" and "JOE" are obtained as second query result. Accordingly, for the same query different results are returned depending on the path traversed during execution of the query.

Assume now that the user who issued the abstract query expects, based on the underlying MAGE-ML document, a query result which indicates all patients having had "COMPOUND_A" type analysis and cancer cell identification. Assume further that the information about cancer cell identification is contained in table 650. Thus, a path must be selected which contains table 650, so that the information about cancer cell identification is reflected in the query result. In other words, only use of the second path including the table 650 can lead to the expected query result, i.e., the second query result. Conversely, traversal of the first path will not produce the expected query result because table 650 is not included in this path.

More generally, in order to return an expected query result, the correct path must be selected for a given abstract query. For instance, in some cases the physical data abstractly described by a given data abstraction model is mapped in from a different data representation. As noted above, the relational database shown in FIGS. 6 and 7 has been mapped in from an XML data source, i.e., an underlying MAGE-ML document. The XML data source includes relationships which define the correct path for the given abstract query. Therefore, it is desirable to maintain the original XML relationships in the data abstraction model so that the correct path can be selected for the given abstract query. This may be accomplished using the relationship manager 150 of FIG. 1, as described in more detail below with reference to FIGS. 8-10.

Figure 8:
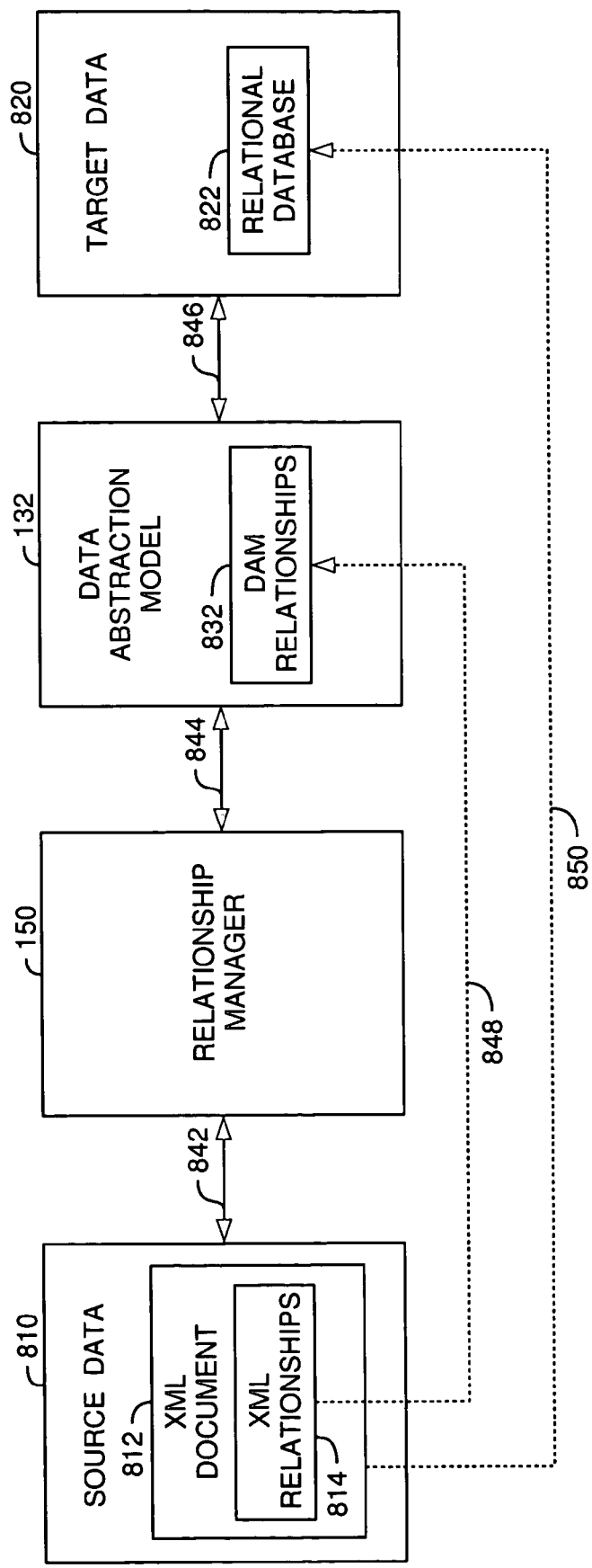
FIG. 8 is a relational view of software components in one embodiment.

Referring now to FIG. 8, an illustrative relational view of the data abstraction model 132 and the relationship manager 150 of FIG. 1 is shown. The relational view exemplifies operation and interaction of the data abstraction model 132 and the relationship manager 150 with respect to source data 810 and target data 820 in one embodiment.

According to one aspect, the relationship manager 150 is used to reflect relationships between data elements of the source data 810 in the target data 820. The source data 810 is organized according to a first physical representation. The target data 820 is organized according to a second physical representation, which is abstractly described by the data abstraction model 132, as indicated by an arrow 846. By way of example, the first physical representation is illustrated as a hierarchical schema in the form of an XML document 812 and the second physical representation is illustrated as a relational schema in a relational database 822 (e.g., the relational database of FIGS. 6-7). In one embodiment, the relational database 822 includes a multiplicity of data structures. For instance, the relational database 822 may include a multiplicity of database tables, each having a plurality of columns. In one embodiment, the relational database 822 is populated with data from the XML document 812, as indicated by dotted arrow 850.

It should be noted that the XML document 812 is merely illustrated by way of example. The invention is, however, not intended to be limited to a first physical representation defined by an XML document. Instead, any known and unknown representations of data elements having predefined relationships are contemplated as the first physical representation, including any XML schema or XML-based documents, such as MAGE-ML documents, or documents in other text-based markup languages.

The XML document 812 is illustrated with predefined relationships 814. The predefined relationships 814 define relationships between data elements described in the XML document 812. The predefined relationships can be determined by the relationship manager 150, as indicated by an arrow 842. To this end, the relationship manager 150 includes a plurality of constituent functions which are explained in more detail with reference to FIG. 9.

According to one aspect, the relationship manager 150 generates logical relationships 832 on the basis of the determined predefined relationships 814, as indicated by a dotted arrow 848. Each logical relationship describes a path for traversing the relational database 822 from a first database table (e.g., database table 610 of FIGS. 6 and 7) to a second database table (e.g., database table 630 of FIGS. 6 and 7). In order to reflect the predefined relationships 814 in the relational database 822, the relationship manager 150 associates the logical relationships 832 with the data abstraction model 132, as indicated by an arrow 844.

Figure 9:
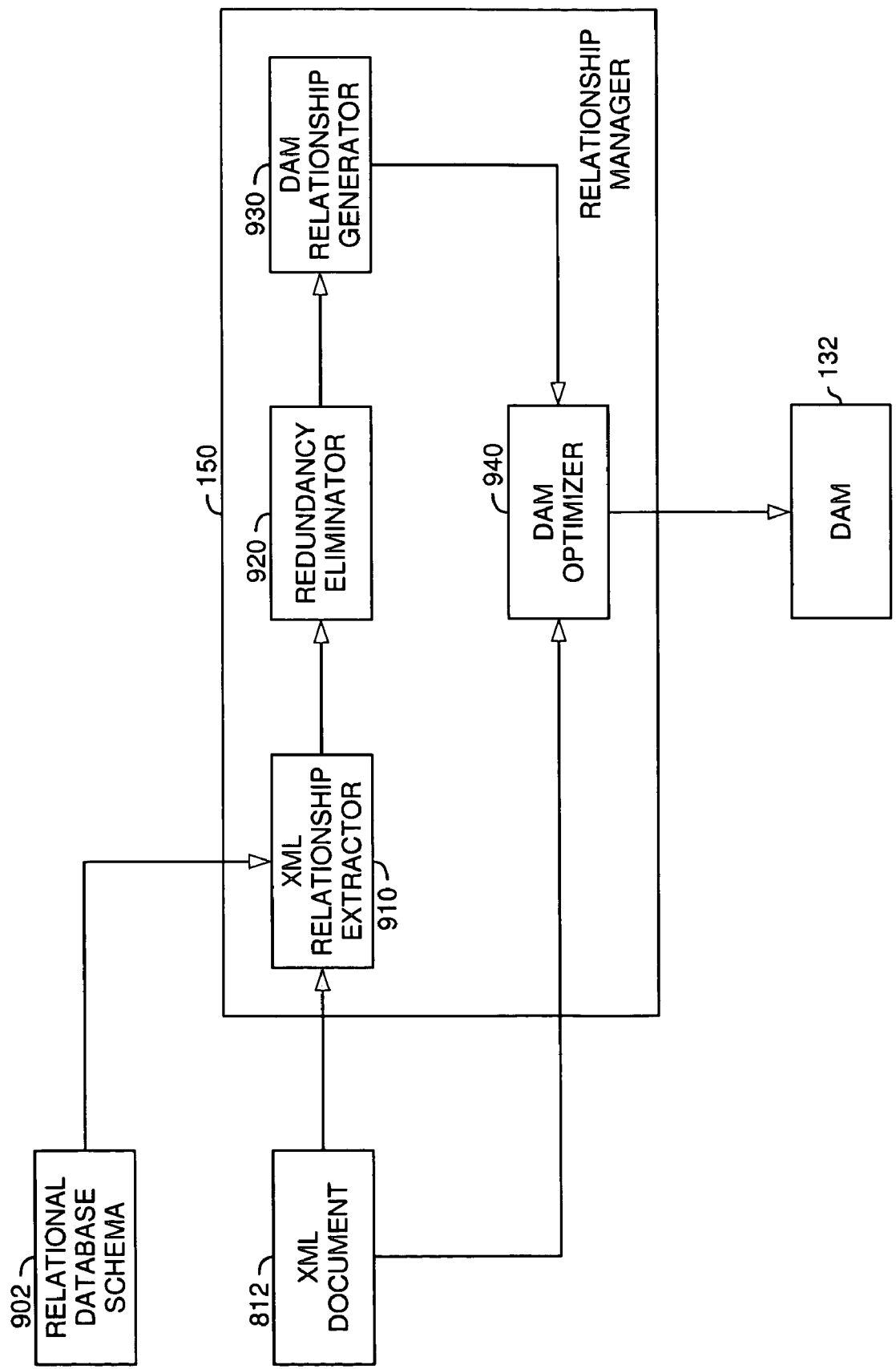
FIG. 9 is a relational view of software components for relationship management in one embodiment.

Referring now to FIG. 9, the relationship manager 150 is shown having a plurality of components implementing its constituent functions. These components include a relationship extractor 910, a redundancy eliminator 920, a relationship generator 930 and a data abstraction model optimizer 940. However, the components of the relationship manager 150 shown in FIG. 9 are merely illustrative and are not intended to limit the invention to a particular software architecture of the relationship manager 150.

Illustratively, the relationship manager 150 receives as input the XML document 812 of FIG. 8 and a relational database schema 902 (e.g., the relational database schema defining the relational database 822 of FIG. 8). Alternatively, the relationship manager 150 can generate the relational database schema 902 on the basis of the XML document 812. Furthermore, in one embodiment the relationship manager 150 can generate an associated relational database organized according to the relational database schema 902. In another embodiment, the relationship manager 150 can populate the associated relational database with physical data entities from the XML document 812.

An illustrative XML document corresponding to the XML document 812 is shown in Table III below. By way of illustration, the illustrative XML document is a MAGE-ML document describing an exemplary Biomaterial Package.

TABLE III

XML DOCUMENT EXAMPLE

| | |
|---|---|
| 001 | <?xml version='1 0' encoding='ISO-8859-1' ?> |
| 002 | <!DOCTYPE MAGE-ML SYSTEM 'MAGE-ML.dtd'> |
| 003 | <MAGE-ML identifier='MAGE:IBM:LifeSciences:Microarray'> |
| 004 |   <BioMaterial_package> |
| 005 |     <Compound_assnlist> |
| 006 |       <Compound identifier="IBM:LifeSciences:Microarray: NaCl" |
| 007 |         name="NaCl" isSolvent="false"> |
| 008 |         <ComponentCompounds_assnlist> |
| 009 |           <CompoundMeasurement> |
| 010 |             <Compound_assnref> |
| 011 |               <Compound_ref identifier="jarrett:wd40" /> |
| 012 |             </Compound_assnref> |
| 013 |             <Measurement_assn> |
| 014 |               <Measurement type="absolute" |
| 015 |                 value="191.121" kindCV="mass"> |
| 016 |               <Unit_assn> |
| 017 |                 <MassUnit unitNameCV=mg></MassUnit> |
| 018 |               </Unit_assn> |
| 019 |               </Measurement> |
| 020 |             </Measurement_assn> |
| 021 |           </CompoundMeasurement> |
| 022 |         </ComponentCompounds_assnlist> |
| 023 |       </Compound> |
| 024 |     </Compound_assnlist> |
| 025 |   </BioMaterial_package> |
| 026 | </MAGE-ML> |

The exemplary XML document of Table III describes the Biomaterial package in lines 004-025. The exemplary XML document includes, for this Biomaterial package, a plurality of data elements, namely a compound element (lines 005-024), a compound measurement element (lines 009-021), a measurement element (lines 013-020) and a mass unit element (lines 016-018). Furthermore, the exemplary XML document relates the data elements to one another. These relationships are represented in FIG. 8 as the XML relationships 814.

In one embodiment, the XML document 812 is processed by the relationship extractor 910 to determine the relationships between the different data elements. To this end, the relationship extractor 910 uses a so-called shredder for parsing and extracting the determined relationships. The relationship extractor 910 further processes the relational database schema 902 to determine data structures, such as tables and columns, corresponding to the data elements. Thus, on the basis of the determined relationships between the different data elements, the relationship extractor 910 determines corresponding relationships between the corresponding data structures defined according to the relational database schema 902. By way of example, the relationship extractor 910 determines five corresponding relationships from the XML document illustrated in Table III. These five relationships (identified as 001-005) are illustrated in Table IV below. It should be noted that table names in Table IV are generally indicated by a "TT_" prefix and that column names are generally indicated by a "T_" prefix for clarity.

TABLE IV

RELATIONSHIP EXAMPLE

| | |
|---|---|
| 001: | Compound(TT_Compound)←T_Compound_ID→ CompoundMeasurement(TT_CompoundMeasurement)→ compound_ID→Compound |
| 002: | Compound(TT_Compound)←T_Compound_ID→ CompoundMeasurement(TT_CompoundMeasurement)→ T_measurement_ID→Measurement (TT_Measurement)→T_unit_ID→MassUnit(TT_MassUnit) |
| 003: | Compound(TT_Compound)←T_Compound_ID→ CompoundMeasurement(TT_CompoundMeasurement)→ T_measurement_ID→Measurement(TT_Measurement) |
| 004: | Compound(TT_Compound)←T_Compound_ID→ CompoundMeasurement(TT_CompoundMeasurement) |
| 005: | Compound (TT_Compound) |

In the following, determination of the above relationships 001-005 of Table IV above is explained by way of example with respect to the relationship 001. More specifically, when parsing the XML document illustrated in Table III, the relationship extractor 910 determines that there is a relationship between the compound element (lines 005-024 of Table III) and the compound measurement element (lines 009-021 of Table III). More specifically, the relationship extractor 910 recognizes that the description of the compound element starts at line 005 of Table III ("Compound_assnlist"), that the description of the compound measurement element starts at line 009 of Table III ("CompoundMeasurement") and that there is a reference to another compound element at line 011 of Table III ("Compound_ref") which concludes the relationship. More specifically, a given compound element may consist of other compound elements. For instance, NaCl may consist of wd40. Accordingly, in the "NaCl" compound element (line 006 of Table III), "Compound_ref" is a reference to a "wd40" compound element (line 011 of Table III). Then, the relationship extractor 910 determines from the relational database schema 902 the tables corresponding to these data elements. In this example, the corresponding tables are "TT_Compound" and "TT_CompoundMeasurement", respectively. Furthermore, the relationship extractor 910 determines from the relational database schema 902 link points, such as a primary key or a foreign key, which link the tables "TT_Compound" and "TT_CompoundMeasurement". Illustratively, the "TT_CompoundMeasurement" table contains a column "T_Compound_ID" that links the "TT_CompoundMeasurement" table to the "TT_Compound" table's primary key column "T_ID". Similarly, the "TT_CompoundMeasurement" table is linked to the "TT_Measurement" table via a foreign key/primary key relationship between the columns "T_Measurement_ID" and "T_ID" from these tables, respectively. Similarly, the "TT_Measurement" table contains a column "T_Unit_ID" that links the "TT_Measurement" table to the "TT_MassUnit" table's primary key column "T_ID". Thus, using these table and column names and the determined relationship between the corresponding data elements in the XML document, the relationship extractor 910 generates the part "Compound(TT_Compound)←T_Compound_ID→ CompoundMeasurement(TT_CompoundMeasurement)" of relationship 001 of Table IV. The remaining part "→compound_ID→Compound" indicates the reference back to the compound element as defined in line 011 of Table III.

In the following, the arrow notation used in Table IV is explained in more detail. As can be seen from Table IV, each one of the relationships 001-005 includes a plurality of data structures which are illustratively connected to one another using directed arrows. As was noted above, the relationships of Table IV have been extracted from the illustrative XML document of Table III, which is a MAGE-ML document describing an exemplary Biomaterial Package. Within MAGE-ML there are various types of relationships that represent parent-child relations. Accordingly, the arrows illustrated in Table IV show whether these relationships extracted from the MAGE-ML document are directed from a parent to a child or a child to a parent. For instance, an association relationship (for example "assn" in line 016 of Table III) indicates that a parent owns one child, hence the parent points to the child. However, in case of an association list (for example "assnlist" in line 005 of Table III), a parent can point to multiple children. In other words, in the given example of Table IV the arrow points from a parent MAGE-ML element to a child in the case of "assn" (line 016 of Table III) and "ref" (line 011 of Table III) elements, and in the case of "assnlist" (line 005 of Table III) and "assnref" (line 010 of Table III) elements, the arrow points from the child to the parent. More specifically, in the first relationship in line 001 of Table IV, "Compound" (line 005 of Table III) is an "assnlist" element having a child "CompoundMeasurement" (line 009 of Table III) which points (first arrow) to "Compound" and "T_Compound_ID" is a column of the "TT_CompoundMeasurement" table, hence the second arrow points from the column towards its owner table. The next arrow from "CompoundMeasurement" points to its child "Compound" to represent the "assnref" element in line 010 of Table III, where the parent points to the child.

It should be noted that in the given example extraction of relationships from an XML document has been described with respect to extracting parent-child relationships defined by underlying MAGE-ML grammar. However, it should be noted that the invention is not limited to extracting parent-child relations from underlying MAGE-ML grammar and that relationships can be extracted in various different ways dependent on various underlying grammar. Accordingly, it is contemplated that a corresponding relationship manager can be implemented such that relationships can be extracted from any, known or unknown, underlying text-based markup-language grammar.

In one embodiment, the determined relationships are then operated on by the redundancy eliminator 920 which removes any redundant relationship. In the given example, as can be seen from Table IV, relationship 005 is contained in all other relationships. Furthermore, relationship 004 is contained in relationships 001 and 002 and relationship 003 is contained in relationship 002. Accordingly, the relationships 001 and 002 fully describe the relationships corresponding to the relationships in the XML document. The other relationships, i.e., relationships 003-005, are therefore redundant. Therefore, the redundancy eliminator 920 removes the relationships 003-005 from the determined relationships illustrated in Table IV. Thus, the relationship generator 930 subsequently only operates on relationships 001 and 002 of Table IV.

It should be noted that the redundancy eliminator 920 is intended to improve functionality of the relationship manager 150. However, the redundancy eliminator 920 is merely optional and can be omitted in specific embodiments. In such specific embodiments, the relationship extractor 910 provides all determined relationships directly to the relationship generator 930.

The relationship generator 930 generates corresponding logical relationships abstractly describing the determined physical relationships. In one embodiment, the logical relationships are suitable to be included with the data abstraction model 132. By way of example, the relationship generator 930 determines three logical relationships from the provided relationships 001 and 002 illustrated in Table IV. In one embodiment, these three logical relationships are stored as a persistent data object in memory. These three logical relationships are illustrated in Table V below.

TABLE V

LOGICAL RELATIONSHIPS EXAMPLE

```
001  <Link id="c2cm" source="TT_COMPOUND"
002     target="TT_COMPOUNDMEASUREMENT" type="LEFT"
003     sourceCardinality="one" targetCardinality="many">
004     <LinkPoint source="T_ID" target="T_COMPOUND_ID" />
005  </Link>
006  <Link id="m2cm" source="TT_MEASUREMENT"
007     target="TT_COMPOUNDMEASUREMENT" type="LEFT"
008     sourceCardinality="one" targetCardinality="many">
009     <LinkPoint source="T_ID" target=
          "T_MEASUREMENT_ID" />
010  </Link>
011  <Link id="mu2m" source="TT_MASSUNIT"
012     target="TT_MEASUREMENT" type="LEFT"
013     sourceCardinality="one" targetCardinality="many">
014     <LinkPoint source="T_ID" target="T_UNIT_ID" />
015  </Link>
```

Illustratively, lines 001-005 describe a first logical relationship, lines 006-010 describe a second logical relationship and lines 011-015 describe a third logical relationship. In the given example, the first logical relationship is generated on the basis of the determined relationship 001 of Table IV above and the second and third logical relationships are generated on the basis of the determined relationship 002 of Table IV above. Each of the generated logical relationships is uniquely identified by a relationship name attribute "id" (lines 001, 006 and 011) and describes a path between a first (source) and a second (target) data structure of the relational database schema 902. For instance, the first logical relationship "c2cm" (line 001) describes a path between a "source" database table "TT_COMPOUND" (line 001) and a "target" database table "TT_COMPOUNDMEASUREMENT" (line 002). The source target table contains a column "T_ID" including a unique identifier which refers to a column "T_COMPOUND_ID" in the target database (line 004). In other words, these two columns define a "LinkPoint" (line 004) which links the tables "TT_COMPOUND" and "TT_COMPOUNDMEASUREMENT" in the relational database schema 902.

In one embodiment, the relationship generator 930 provides the generated logical relationships to the data abstraction model (DAM) optimizer 940. The DAM optimizer associates the logical relationships with the data abstraction model 132. More specifically, the DAM optimizer 940 includes the logical relationships with the data abstraction model 132 and thereby associates the logical relationships with corresponding logical field specifications in the data abstraction model 132. In the given example, the logical relationships describe an overall path from the database table "TT_COMPOUND" (line 001 of Table V) to the database table "TT_MASSUNIT" (line 011 of Table V). These logical relationships can be associated with one or more logical field specifications, as for example with a logical field specification for the "T_ID" column of the "TT_MASSUNIT" table, as shown in Table VI below. By way of illustration, the illustrative logical field specification is defined using XML. However, any other language may be used to advantage.

TABLE VI

LOGICAL FIELD SPECIFICATION EXAMPLE

```
001  <Field queryable="Yes" name="MassUnit-ID" displayable="Yes"
002      Relationship="Compound">
003        <AccessMethod>
004          <Simple attrName="T_ID"
005            entityName="TT_MASSUNIT"></Simple>
006        </AccessMethod>
007        <Type baseType="INT"> </Type>
008  </Field>
009  <Relationship>
010      <RelType name="Compound">
011        <Path>
012          <LinkRef id="c2cm"/>
013          <LinkRef id="m2cm"/>
014          <LinkRef id="mu2m"/>
015        </Path>
016      </RelType>
017  <Relationship>
```

By way of example, Table VI illustrates a logical field specification which is built using the logical relationships of Table V. In the given example, Table VI illustrates a logical field specification "MassUnit-ID" (line 001) which defines a simple access method (lines 003-006) for accessing the column "T_ID" (line 004) in the table "TT_MASSUNIT" (line 005) of the relational database. Illustratively, the logical field specification includes a name attribute having the value "MassUnit-ID" (line 001), whereby the user is provided with a relatively intuitive logical field name to facilitate composing abstract queries. In addition, the logical field specification "MassUnit-ID" includes an attribute "Relationship" (line 002) having a value "Compound" indicating that the logical field "MassUnit-ID" has a relationship to the "TT_COMPOUND" table. This "Relationship" attribute is referenced at runtime in order to determine whether the execution of a given query should traverse a specific path defined in the logical field specification. The specifics of the relationship are described between lines 009 and 017 of the above logical field specification. In one embodiment, the relationship definition is given a name. For example, in this case the relationship definition is given the name "Compound" (line 010). The relationship definition name is not considered a necessary element, but may be used to facilitate an optimization described below. A specific path definition is defined at lines 011 through 015. In this particular implementation, the path definition includes three "LinkRef" tags and corresponding IDs ("id"). The "LinkRef" IDs correspond to the link IDs in the logical relationships in Table V. In this case, all three of the logical relationships are referenced by their respective IDs. Accordingly, the path definition as defined by the collective link references "LinkRef" defines the path from the table "TT_COMPOUND" to the table "TT_MASSUNIT". Thus, if an abstract query is received that selects columns of these two tables as result fields, the overall path defined according to the underlying logical relationships can be used to traverse the associated relational database. For example, a user may build an abstract query for determining a list of all patients who had micro array analysis using "Compound_A". The list should include patient names and mass units. A corresponding SQL query is illustrated in Table VII below.

TABLE VII

SQL QUERY EXAMPLE

```
001  SELECT A.PATIENT_NAME, A.MASS_UNIT, A.T_ID AS
002      MassUnit-ID, B.T_COMPOUNDNAME
003  FROM TT_MASSUNIT A, TT_COMPOUND B,
004      TT_COMPOUNDMEASUREMENT C,
         TT_MEASUREMENT D
005  WHERE B.T_COMPOUNDNAME = 'Compound_A'
006      AND B.T_ID = C.T_COMPOUND_ID
007      AND C.T_MEASUREMENT_ID = D.T_ID
008      AND D.T_UNIT_ID = A.T_ID
```

Illustratively, the exemplary SQL query shown in Table VII is generated using the data abstraction model shown in Table VI. According to line 001, results fields selected to be determined as a query result are "Patient_Name", "Mass_Unit", "MassUnit-ID" and "CompoundName". Line 005 indicates that the user has selected to retrieve all data records having a CompoundName "Compound_A". Furthermore, since the "MassUnit-ID" field is selected from the data abstraction model of Table VI (line 001 of Table VII), the relationship specified for this field (Relationship="Compound" in line 002 of Table VI) has been used to generate the exemplary SQL query. Hence, the path definition of Table VI, lines 009 to 017 is used. Thus, the exemplary SQL query uses the path defined by the logical relationships shown in Table V. Using the database tables illustrated in FIG. 7, the query result illustrated in Table VIII below is determined for the exemplary SQL query of Table VII, as explained above with respect to FIG. 7.

TABLE VIII

QUERY RESULT EXAMPLE

| T_CompoundName | MassUnit-ID | Patient_Name | Mass_Unit |
|---|---|---|---|
| Compound_A | 1 | Jilani | 76 kg |
| Compound_A | 4 | Joe | 58 kg |

In the above described embodiment, the logical relationships (Table V) are implemented as a persistent object that may exist internally or externally to the DAM and are referenced by pointers (i.e. the "LinkRefs") defined with the respective logical field specifications. Thus, the link references provide a short-hand approach for referencing the logical relationships within the logical field specifications. In this case, the DAM relationships 832 refers collectively to the logical relationships object and the path definitions in the various logical field specifications. However, it should also be understood that the logical relationships of Table V may be incorporated directly into the respective field specifications. The former approach is considered to be more desirable in most cases due to the need for less memory and increased maintenance costs associated with the DAM. In any case, the collective information associated with the DAM that describes the logical relationships (Table V) and the path definitions in the various logical field specifications is represented as the DAM relationships 832 of FIG. 8.

As noted above, the relationship type name "Compound" at line 010 may be used to facilitate an optimization of the logical field specifications. Specifically, the relationship name may be used as a short-hand reference to the collective link references. This short-hand reference may then be used to replace groups of corresponding link references in other logical field specifications. Thus, if it can be determined that a given group of link references represents a subset of another group, the short-hand name for the given group (i.e., "Compound" in this example) can be substituted for the subset in the other group. An exemplary illustration of two different groups of link references, one of which includes a group reference to the other, is illustrated in Table IX below.

TABLE IX

GROUP REFERENCE EXAMPLE

```
001  <Relationship>
002    <RelType name="Compound">
003      <Path>
004        <LinkRef id="c2cm"/>
005        <LinkRef id="m2cm"/>
006        <LinkRef id="mu2m"/>
007      </Path>
008    </RelType>
009    <RelType name="Compound1">
010      <Path>
011        <RelationshipRef id="Compound"/>
012        <LinkRef id="a2b"/>
013      </Path>
014    </RelType>
015  <Relationship>
```

Illustratively, the example of Table IX includes in lines 002-008 the "Compound" group of Table VI. Table IX further includes a group of link references "Compound1" (lines 009-014). The "Compound1" group contains all link references of the "Compound" group and an additional link reference "a2b" (line 012). Accordingly, a group reference "RelationshipRef" to the "Compound" group has been included in line 011. This avoids duplicating common link references and improves parsing efficiency as well as readability and maintainability of the data abstraction model 132. Furthermore, it should be noted that different "RelationshipRef" elements could be nested within each other, allowing each path to be arbitrarily deeply nested with references to other paths.

Figure 10:
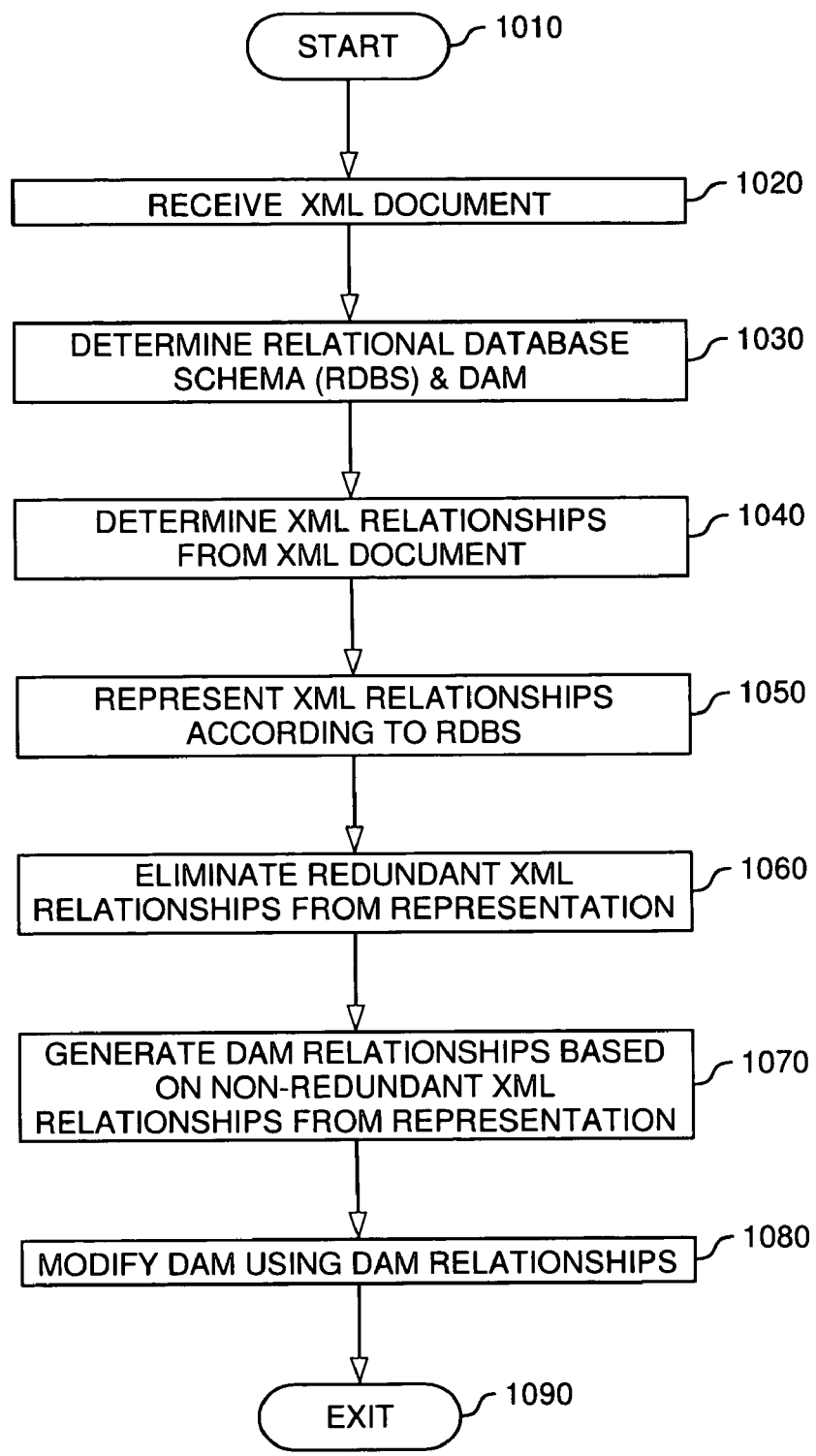
FIG. 10 is a flow chart illustrating a method for relationship management in one embodiment.

Referring now to FIG. 10, one embodiment of a method 1000 for logically representing relationships between data elements described in an XML document is shown. At least part of the steps of method 1000 can be performed by a relationship manager (e.g., relationship manager 150 of FIG. 1). Method 1000 is entered at step 1010.

At step 1020, the XML document (e.g., XML document 612 of FIG. 6) is received. At step 1030, a corresponding relational database schema (e.g., relational database schema 902 of FIG. 9) is retrieved or generated for a plurality of data structures corresponding to the data elements. Furthermore, a logical representation (e.g., data abstraction model 132 of FIG. 6) abstractly describing the relational database schema is retrieved or generated.

At step 1040, relationships between the data elements of the XML document are determined from the XML document (e.g., relationships 614 of FIG. 6). At step 1050, corresponding relationships between corresponding data structures defined according to the relational database schema are determined on the basis of the determined relationships. At step 1060, any redundant relationships are removed from the determined corresponding relationships. At step 1070, logical relationships abstractly describing all non-redundant determined corresponding relationships are generated.

At step 1080, the generated logical relationships are included with the logical representation. Method 1000 then exits at step 1090.

It should be noted that any reference herein to particular values, definitions, programming languages and examples is merely for purposes of illustration. Accordingly, the invention is not limited by any particular illustrations and examples. Furthermore, while the foregoing is directed to embodiments of the present invention, other and further embodiments of the invention may be devised without departing from the basic scope thereof, and the scope thereof is determined by the claims that follow.

What is claimed is:

1. A computer-implemented method of logically representing relationships between data elements defined according to a first physical representation of data, comprising:
   providing a logical representation of the data, the logical representation abstractly describing a second physical representation of the data, wherein the second physical representation of the data is generated from the first physical representation of the data;
   on the basis of the relationships between the data elements defined according to the first physical representation of the data, determining corresponding relationships between corresponding data structures defined according to the second physical representation of the data;
   generating logical relationships abstractly describing the determined corresponding relationships, each logical relationship defining a path between data structures of the second physical representation;
   associating the generated logical relationships with the logical representation of the data; and
   storing the associations and the generated logical relationships on one or more computer-readable storage media.

2. The method of claim 1, wherein the logical representation comprises a plurality of logical field specifications, and wherein associating comprises including the generated logical relationships with respective logical field specifications.

3. The method of claim 1, wherein the first physical representation of the data is a document in text-based markup language.

4. The method of claim 3, wherein the text-based markup language is one of the eXtended Markup Language (XML) and the MicroArray Gene Expression Markup Language (MAGE-ML).

5. The method of claim 1, wherein the second physical representation is a relational representation.

6. The method of claim 5, wherein each data structure is a table of the relational representation.

7. The method of claim 1, wherein the first physical representation is a hierarchical representation and the second physical representation is a relational representation.

8. The method of claim 7, wherein the hierarchical representation is the eXtended Markup Language (XML).

9. The method of claim 7, wherein each data structure is a table of the relational representation.

10. The method of claim 1, further comprising removing any redundant determined corresponding relationships before generating the logical relationships.

11. A computer-implemented method of logically representing relationships between data elements defined according to a first physical representation of data, comprising:
    generating a second physical representation of the data from the first physical representation;
    generating a logical representation of the data as represented according to the second physical representation, the logical representation abstractly describing the second physical representation of the data;
    on the basis of the relationships between the data elements defined according to the first physical representation of the data, determining corresponding relationships between corresponding data structures defined according to the second physical representation of the data;

generating logical relationships abstractly describing the determined corresponding relationships;

including the generated logical relationships with the logical representation; wherein each of the generated logical relationships describes a path for traversing the second physical representation from a first data structure to a second data structure when processing a query requesting information related to the first and second data structures; and storing the second physical representation, the generated logical relationships, and the logical representation on one or more computer-readable storage media.

12. The method of claim 11, wherein the first physical representation of the data is a document in text-based markup language.

13. The method of claim 12, wherein the text-based markup language is one of the eXtended Markup Language (XML) and the MicroArray Gene Expression Markup Language (MAGE-ML).

14. The method of claim 11, wherein the second physical representation is a relational representation.

15. The method of claim 14, wherein each data structure is a table of the relational representation.

16. The method of claim 11, further comprising removing any redundant determined corresponding relationships before generating the logical relationships.

17. A computer-implemented method of logically representing relationships between data elements described in an eXtended Markup Language (XML) document, comprising:

retrieving a relational database schema for a plurality of data structures, each data structure corresponding to one of the data elements;

retrieving a logical representation abstractly describing the relational database schema;

determining the relationships between the data elements from the XML document;

on the basis of the determined relationships, determining corresponding relationships between corresponding data structures defined according to the relational database schema;

generating logical relationships abstractly describing the determined corresponding relationships;

including the generated logical relationships with the logical representation; wherein each of the generated logical relationships describes a path for traversing a relational database constructed according to the relational database schema from a first data structure to a second data structure when processing a query requesting information related to the first and second data structures; and storing the generated logical relationships on one or more computer-readable storage media.

18. A computer-implemented method of querying physical data logically represented by a data abstraction model, wherein the physical data being queried is contained in data structures generated from a data source having a different schema from the data structures containing the physical data being queried, comprising:

receiving an abstract query comprising logical fields and corresponding values, wherein each of the logical fields is defined in the data abstraction model and wherein one or more of the logical fields are result fields to be returned by execution of the abstract query; and transforming, by operation of a processor, the abstract query into an executable query capable of being executed against the physical data; wherein the transforming is done using the data abstraction model and wherein the data abstraction model defines a specific path for traversing the data structures containing the physical data to reach the one or more result fields.

19. A computer-readable medium containing a program which, when executed by a processor, performs a process of logically representing relationships between data elements defined according to a first physical representation of data, the process comprising:

retrieving a logical representation of the data, the logical representation abstractly describing a second physical representation of the data, wherein the second physical representation of the data is generated from the first physical representation of the data;

on the basis of the relationships between the data elements defined according to the first physical representation of the data, determining corresponding relationships between corresponding data structures defined according to the second physical representation of the data;

generating logical relationships abstractly describing the determined corresponding relationships, each logical relationship defining a path between data structures of the second physical representation;

associating the generated logical relationships with the logical representation of the data; and storing the associations and the generated logical relationships on one or more computer-readable storage media.

20. The computer-readable medium of claim 19, wherein the logical representation comprises a plurality of logical field specifications, and wherein associating comprises including the generated logical relationships with respective logical field specifications.

21. The computer-readable medium of claim 19, wherein the first physical representation of the data is a document in text-based markup language.

22. The computer-readable medium of claim 21, wherein the text-based markup language is one of the eXtended Markup Language (XML) and the MicroArray Gene Expression Markup Language (MAGE-ML).

23. The computer-readable medium of claim 19, wherein the second physical representation is a relational representation.

24. The computer-readable medium of claim 23, wherein each data structure is a table of the relational representation.

25. The computer-readable medium of claim 19, wherein the first physical representation is a hierarchical representation and the second physical representation is a relational representation.

26. The computer-readable medium of claim 25, wherein the hierarchical representation is the eXtended Markup Language (XML).

27. The computer-readable medium of claim 25, wherein each data structure is a table of the relational representation.

28. The computer-readable medium of claim 19, wherein the process further comprises:

removing any redundant determined corresponding relationships before generating the logical relationships.

29. A computer-readable medium containing a program which, when executed by a processor, performs a process of logically representing relationships between data elements defined according to a first physical representation of data, the process comprising:

generating a second physical representation of the data from the first physical representation;

generating a logical representation of the data as represented according to the second physical representation, the logical representation abstractly describing the second physical representation of the data;

on the basis of the relationships between the data elements defined according to the first physical representation of the data, determining corresponding relationships between corresponding data structures defined according to the second physical representation of the data;

generating logical relationships abstractly describing the determined corresponding relationships; and including the generated logical relationships with the logical representation; wherein each of the generated logical relationships describes a path for traversing the second physical representation from a first data structure to a second data structure when processing a query requesting information related to the first and second data structures; and storing the second physical representation, the generated logical relationships, and the logical representation on one or more computer-readable storage media.

30. The computer-readable medium of claim 29, wherein the first physical representation of the data is a document in text-based markup language.

31. The computer-readable medium of claim 30, wherein the text-based markup language is one of the eXtended Markup Language (XML) and the MicroArray Gene Expression Markup Language (MAGE-ML).

32. The computer-readable medium of claim 29, wherein the second physical representation is a relational representation.

33. The computer-readable medium of claim 32, wherein each data structure is a table of the relational representation.

34. The computer-readable medium of claim 29, wherein the process further comprises:

removing any redundant determined corresponding relationships before generating the logical relationships.

35. A computer-readable medium containing a program which, when executed by a processor, performs a process of logically representing relationships between data elements described in an eXtended Markup Language (XML) document, the process comprising:

retrieving a relational database schema for a plurality of data structures, each data structure corresponding to one of the data elements;

retrieving a logical representation abstractly describing the relational database schema;

determining the relationships between the data elements from the XML document;

on the basis of the determined relationships, determining corresponding relationships between corresponding data structures defined according to the relational database schema;

generating logical relationships abstractly describing the determined corresponding relationships;

including the generated logical relationships with the logical representation; wherein each of the generated logical relationships describes a path for traversing a relational database constructed according to the relational database schema from a first data structure to a second data structure when processing a query requesting information related to the first and second data structures; and storing the generated logical relationships on one or more computer-readable storage media.

36. A computer-readable medium containing a program which, when executed by a processor, performs a process of querying physical data logically represented by a data abstraction model, wherein the physical data being queried is contained in data structures generated from a data source having a different schema from the data structures containing the physical data being queried, the process comprising:

receiving an abstract query comprising logical fields and corresponding values, wherein each of the logical fields is defined in the data abstraction model and wherein one or more of the logical fields are result fields to be returned by execution of the abstract query; and transforming, by operation of a processor, the abstract query into an executable query capable of being executed against the physical data; wherein the transforming is done using the data abstraction model and wherein the data abstraction model defines a specific path for traversing the data structures containing the physical data to reach the one or more result fields.

37. The computer-readable medium of claim 36, wherein the specific path is derived from relationships in the data source.

38. The computer-readable medium of claim 36, wherein the data source is a document in text-based markup language.

39. The computer-readable medium of claim 38, wherein the text-based markup language is one of the eXtended Markup Language (XML) and the MicroArray Gene Expression Markup Language (MAGE-ML).

40. The computer-readable medium of claim 36, wherein the data structures containing the physical data being queried are arranged according to a relational schema.

41. The computer-readable medium of claim 40, wherein each data structure containing physical data being queried is a database table according to the relational schema.

42. The computer-readable medium of claim 36, wherein the data source is arranged according to a hierarchical representation and the data structures containing the physical data being queried define a relational representation.

43. The computer-readable medium of claim 42, wherein the hierarchical representation is the eXtended Markup Language (XML).

44. An article, comprising:

a data structure comprising: a plurality of logical field specifications, each abstractly describing at least one of a plurality of data structures defined according to a physical representation of data, wherein at least one of the plurality of logical field specifications includes one or more logical relationships algorithmically generated from relationship information describing relationships between the data represented according to another physical representation of the data, each logical relationship describing a path for traversing the physical representation of the data from a first data structure to a second data structure when processing a query requesting information related to the first and second data structures; and a computer-readable storage medium containing the data structure.

* * * * *